United States Patent [19]

Aubry

[11] Patent Number: 4,491,342
[45] Date of Patent: Jan. 1, 1985

[54] VEHICLE WHEEL SUSPENSION SYSTEM INCORPORATING COAXIAL TUBE DAMPING AND ANTI-ROLL MEANS

[75] Inventor: Jacques A. Aubry, Cabries, France

[73] Assignee: Societa Nationale Industrielle et Aerospatiale, Paris, France

[21] Appl. No.: 496,276

[22] Filed: May 19, 1983

[30] Foreign Application Priority Data

Jun. 15, 1982 [FR] France .............................. 82 10447

[51] Int. Cl.³ .............................................. B60G 7/04
[52] U.S. Cl. ...................................... 280/700; 267/57; 267/154; 280/717; 280/723
[58] Field of Search ............... 280/700, 701, 721, 723, 280/717, 689; 416/134 A, 134 R, 141; 156/182, 60; 267/148, 149, 57 R, 153, 154

[56] References Cited

U.S. PATENT DOCUMENTS

| | | | |
|---|---|---|---|
| 2,712,742 | 7/1955 | Neidhart | 416/134 UX |
| 2,940,785 | 6/1960 | Haushalter | 267/57.1 R X |
| 3,820,813 | 6/1974 | Moulton et al. | 267/57 X |
| 3,856,289 | 12/1974 | Steele | 267/154 |
| 4,349,184 | 9/1982 | Peterson et al. | 416/134 A X |

FOREIGN PATENT DOCUMENTS

| | | | |
|---|---|---|---|
| 720049 | 4/1942 | Fed. Rep. of Germany | 280/700 |
| 2825176 | 12/1978 | Fed. Rep. of Germany | 267/154 |
| 1095983 | 12/1954 | France | 267/57 |
| 455747 | 10/1936 | United Kingdom | 267/57 |

*Primary Examiner*—Joseph F. Peters, Jr.
*Assistant Examiner*—Mitchell J. Hill
*Attorney, Agent, or Firm*—Marshall, O'Toole, Gerstein, Murray & Bicknell

[57] ABSTRACT

The present invention relates to a suspension for a set of two wheels of a vehicle comprising two arms oscillating about an axis X—X transverse to said vehicle and each bearing one of said wheels, elastic means and damper means being associated with said arms respectively to counteract and dampen the vertical movements of said wheels and said elastic means comprising an assembly of two concentric tubes made of a composite fibre-synthetic resin material coaxial to said transverse axis X—X about which the arms oscillate. According to the invention, the tubes are fast with each other near the center of their length; said arms are fast with the ends of the outer tube; said ends of the outer tube may rotate at least in limited manner about said transverse axis X—X, and the inner tube is connected to the chassis of the vehicle by its two ends.

6 Claims, 8 Drawing Figures

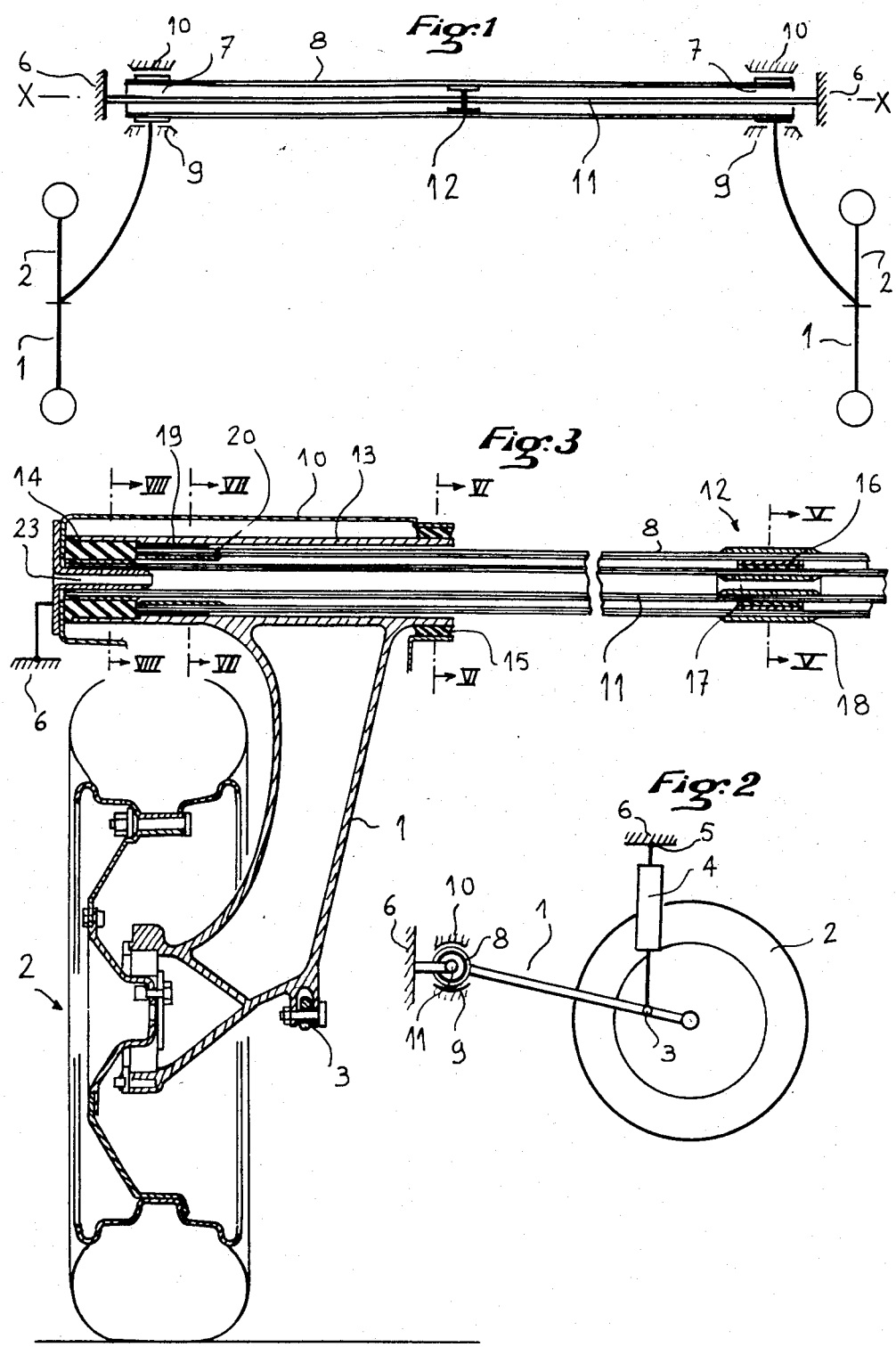

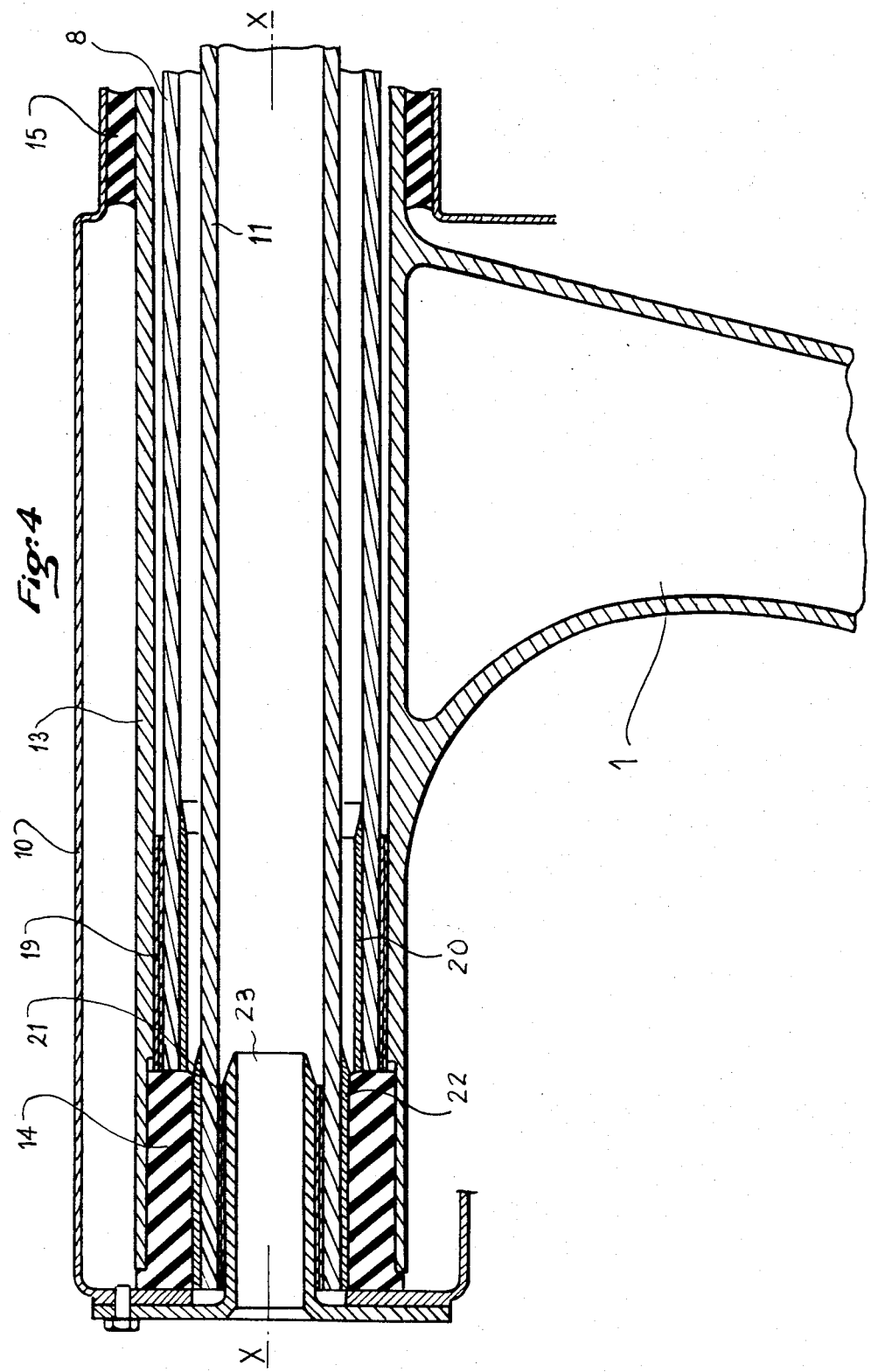

VEHICLE WHEEL SUSPENSION SYSTEM INCORPORATING COAXIAL TUBE DAMPING AND ANTI-ROLL MEANS

The present invention relates to a suspension for a set of two wheels of a vehicle, comprising two arms oscillating about a shaft transverse to said vehicle and each bearing one of said wheels, elastic means and damping means being associated with said arms respectively to counteract and dampen the vertical movements of said wheels. The suspension according to the invention is more particularly, though not exclusively, adapted to be used as rear suspension for an automobile vehicle of front drive type.

The suspension according to the invention is of the type in which said elastic means comprise an assembly of two concentric tubes of composite fibre-synthetic resin material, coaxial to said transverse shaft about which the arms oscillate, and it is characterized in that said tubes are fast with each other near the centre of their length; said arms are fast with the ends of the outer tube; said ends of the outer tube may rotate in limited manner about said transverse shaft and in that the inner tube is connected to the chassis of the vehicle by its two ends.

Each of the sub-assemblies constituted by one half of the outer tube and the corresponding half of the inner tube thus acts as torsion bar for the arm to which it is connected, whilst the outer tube of said assembly acts as anti-roll coupling means between said arms.

The fact of making said tubes in composite fibre-synthetic resin material gives them mechanical characteristics corresponding to the functions that they perform and which would be impossible to obtain with steel tubes, of comparable dimensions and weight. Due to the present invention, a suspension may be made which, whilst being simple, is light, leading to a saving in the total weight of the vehicle and therefore in its fuel consumption. Said tubes preferably have a polygonal cross section. The same applies to the rings and connecting pieces associated with said tubes.

The ends of the inner tube may be anchored directly in the chassis of the vehicle, whilst the ends of the outer tube are pivoted in said chassis. However, in certain cases, particularly for reasons of passenger comfort and road holding ability of the vehicle, it may be important that the wheels present a certain longitudinal clearance. In a variant, the ends of the inner tube may thus be connected to the chassis via stirrup elements adapted to undergo slight oscillatory displacements of direction substantially parallel to the longitudinal direction of the vehicle, whilst the ends of the outer tube are pivoted in said stirrup elements.

In an advantageous embodiment, each arm comprises a hollow transverse sleeve pivoting with respect to the chassis of the vehicle or with respect to said oscillating stirrup elements via two bearings spaced along the transverse shaft about which the arms oscillate, and which sleeve is traversed by one of the ends of said tube assembly, the corresponding end of the outer tube being connected to said sleeve, whilst the corresponding end of the inner tube is connected to the chassis or the stirrup element.

The different fixings and connections may be obtained by friction and/or adhesion.

The present invention also relates to a system for elastic return and anti-roll coupling of the two wheels of a set of wheels of a vehicle equipped with a suspension comprising two arms oscillating about a shaft transverse with respect to said vehicle and each bearing one of said wheels, this system being noteworthy in that it comprises an assembly of inner and outer concentric tubes of composite fibre-synthetic resin material and fast with each other near the centre of their length. Such a system may be operated by fixing the ends of the inner tube on the chassis of the vehicle or on the oscillating stirrup element with longitudinal clearance and by connecting said oscillating arms on the ends of said outer tube.

The invention will be more readily understood on reading the following description of the accompanying drawings, in which:

FIG. 1 schematically shows a suspension of the type according to the invention.

FIG. 2 is a schematic side view corresponding to FIG. 1.

FIG. 3 shows, in plan view and in section, the left-hand half of a suspension according to the invention, the right-hand half of the suspension being identical and symmetrical to this left-hand half.

FIG. 4 shows, on a larger scale, the assembly of the suspension arms on the chassis of the automobile vehicle according to the present invention.

In these Figures, identical references denote like elements.

Figure 5:
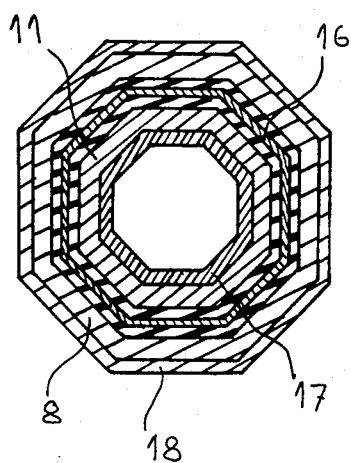
FIGS. 5 to 8 are sections along lines V—V, VI—VI, VII—VII and VIII—VIII respectively of FIG. 3.
Figure 6:
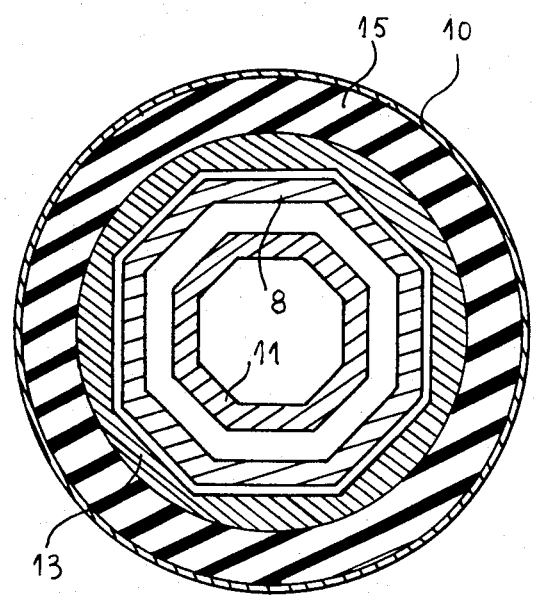
Figure 7:
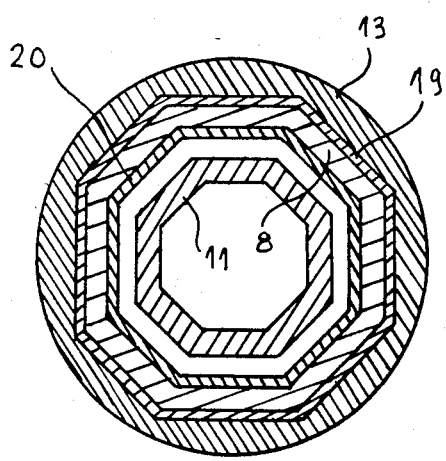
Figure 8:
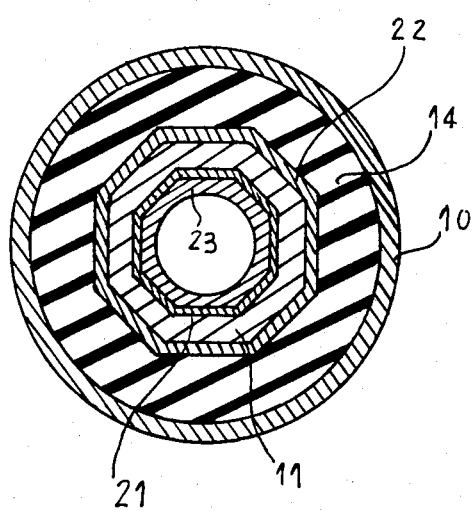

Referring now to the drawings, the rear suspension for frontdrive vehicle, shown in FIGS. 1 and 2, is of the type with drawn wheel and comprising suspension arms 1. One end of each arm bears a wheel 2, and these arms are articulated at 3 on one end of a telescopic shock absorber 4. The other end of the shock absorber 4 is articulated at 5 on the chassis 6 of the vehicle (not shown). If necessary, the shock absorber 4 may possibly act as automatic level control.

The ends of the arms 1 remote from the wheels 2 are respectively rendered fast with the ends 7 of a tube 8 of composite material, whose axis defines the axis X—X, transverse with respect to the vehicle, of clearance of the wheels 2. Moreover, the ends 7 of the tube 8 may oscillate about the axis X—X (tube 8 working in torsion), being guided by bearing arrangements 9. These bearing arrangements pivot the tube 8 either directly with respect to chassis 6 or with respect to a stirrup element 10, itself mounted to oscillate with respect to chassis 6 (in a manner not shown, but as described in Applicants' copending U.S. patent application Ser. No. 486,794, filed Apr. 20, 1983.

Furthermore, another tube 11 of composite material is disposed inside tube 8, whose ends are rendered fast either with the chassis 6 or with the stirrup element 10. Tubes 8 and 11 are rendered fast with each other at 12, near their centre.

The vertical stiffness of the suspension (vertical clearance of the wheels 2) is thus ensured, for each wheel 2, by the halves of tubes 8 and 11, disposed towards the corresponding wheel and connected to each other at 12, whilst the anti-roll coupling is ensured by the outer torsion tube 8 connecting the two suspension arms 1. The longitudinal stiffness of the suspension is possibly obtained by adjusting the stiffness of oscillation of the stirrup elements 10 with respect to the chassis 6.

It will be noted that the suspension according to the invention is self-stabilizing, as its different elements always tend to return into their initial position of equilibrium.

In the embodiment shown in FIGS. 3 and 4, the arms 1 each comprise an elongated sleeve 13 of axis X—X, i.e. tranverse with respect to said arms, said sleeve being located at the end of the arm remote from the corresponding wheel 2.

At the two ends of a sleeve 13 are arranged bearings 14 and 15 respectively, connecting said arms 1 to the corresponding stirrup element 10. Bearings 14 and 15, whose axis merges with axis X—X, are preferably of the laminated type and therefore allow the arms 1 to rotate about said axis X—X.

As mentioned above, the two arms 1 of the suspension of a set of two wheels 2 are connected to each other by the assembly of the two tubes 8 and 11, concentric with respect to each other and centred on axis X—X. The two tubes 8 and 11 are made of a composite material constituted by fibres (glass, carbon, boron, etc. or a mixture of these matters) coated with a synthetic resin by any known process (filament winding, superposition of braids, weaving etc.) making it possible to obtain for said tubes high values of the ratio R/E, in which R is the stress at break and E the modulus of elasticity. Tubes 8 and 11 may present a polygonal, for example octogonal cross section.

Tubes 8 and 11 are rendered fast with each other at their centre 12, for example by adhesion with the interposition of an intermediate ring 16. Inner (17) and outer (18) metal bands are provided to reinforce the connection of said tubes 8 and 11 at 12.

The ends of the tubes 8 and 11 pass through the sleeves 13 of the two coupled arms 1.

The ends of the outer torsion tube 8 are rendered fast with the sleeves 13, and therefore with arms 1, by adhesion with the interposition of spacer rings 19 in hard elastomer. Metal bands 20 for reinforcing the tube 8 may be provided at the locations of the spacer rings 19.

The ends of the inner torsion tube 11 are rendered fast with the stirrup elements 10 by adhesion with the interposition of spacer rings 21 in hard elastomer. Metal bands 22 for reinforcing the tube 11 may be provided at the locations of the spacer rings 21.

In the embodiment shown in FIGS. 3 and 4, bearings 15 are disposed between the outer wall of the sleeves 13 and the stirrup elements 10, whilst bearings 14 are arranged between the inner wall of the sleeves 13 and the outer wall of the inner tube 11. In this case, fingers 23 are made fast with the stirrup elements 10 and penetrate inside the inner tube 11. The spacer rings 21 are then disposed between the fingers 23 and the inner wall of the tube 10 to connect the tube 11 with said fingers 23.

What is claimed is:

1. A suspension for a set of two wheels of a vehicle having a chassis, said suspension comprising two arms adapted to oscillate about an axis X—X transverse to said vehicle, each arm bearing one of said wheels,
   elastic damper means associated with said arms to counteract and dampen the vertical movements of said wheels,
   said elastic means comprising an assembly of inner and outer concentric tubes made of a composite fibre-synthetic resin material coaxial to said transverse axis X—X,
   said tubes being connected to each other near the center of their length;
   said arms being connected to the ends of the outer tube;
   said outer tube being mounted on said chassis for rotation about said transverse axis X—X,
   and the inner tube being effectively connected at its ends to the chassis of the vehicle.

2. The suspension of claim 1, wherein the ends of the inner tube are attached directly to the chassis of the vehicle, while the ends of the outer tube are pivoted with respect to said chassis.

3. The suspension of claim 1, wherein the ends of the inner tube are connected to the chassis of the vehicle via stirrup elements adapted to undergo slight oscillatory displacements of direction substantially parallel to the longitudinal direction of the vehicle, the ends of the outer tube being pivoted in said stirrup elements.

4. The suspension of claim 3, wherein each arm comprises a hollow transverse sleeve pivotable with respect to the chassis of the vehicle via two bearings spaced along said transverse axis (X—X) about which the arms oscillate, said sleeve being traversed by one of the ends of said tube assembly, the corresponding end of the outer tube being connected to said sleeve.

5. The suspension of claim 1, wherein the connections of the tubes with each other and of the tubes with the chassis are obtained by adhesion.

6. The suspension of claim 1, wherein the outer and inner tubes present a polygonal cross section.

* * * * *

UNITED STATES PATENT AND TRADEMARK OFFICE
CERTIFICATE OF CORRECTION

PATENT NO. : 4,491,342

DATED : January 1, 1985

INVENTOR(S) : JACQUES A. AUBRY

It is certified that error appears in the above-identified patent and that said Letters Patent is hereby corrected as shown below:

Cover Page, Line [73], the Assignee's name should read

-- Societe Nationale Industrielle Aerospatiale--

Signed and Sealed this

Nineteenth Day of November 1985

[SEAL]

Attest:

DONALD J. QUIGG

Attesting Officer

Commissioner of Patents and Trademarks